(12) United States Patent
Joshi et al.

(10) Patent No.: US 11,353,861 B2
(45) Date of Patent: Jun. 7, 2022

(54) AUTOENCODER UTILIZING VEHICLE CONTEXTUAL INFORMATION

(71) Applicants: TOYOTA MOTOR ENGINEERING & MANUFACTURING NORTH AMERICA, INC., Plano, TX (US); UNIVERSITY OF CONNECTICUT, Farmington, CT (US)

(72) Inventors: Shailesh N. Joshi, Ann Arbor, MI (US); Donald Mcmenemy, Willington, CT (US); John Kaminski, Vernon, CT (US); Ravi Rajamani, West Hartford, CT (US); Muhamed Farooq, Dearborn, MI (US); Krishna Pattipati, Storrs, CT (US); Ali Bazzi, South Windsor, CT (US)

(73) Assignees: TOYOTA MOTOR ENGINEERING & MANUFACTURING NORTH AMERICA, INC., Plano, TX (US); UNIVERSITY OF CONNECTICUT, Farmington, CT (US)

( * ) Notice: Subject to any disclaimer, the term of this patent is extended or adjusted under 35 U.S.C. 154(b) by 218 days.

(21) Appl. No.: 16/866,047

(22) Filed: May 4, 2020

(65) Prior Publication Data
US 2021/0341911 A1 Nov. 4, 2021

(51) Int. Cl.
G05B 23/02 (2006.01)
G06K 9/62 (2022.01)
G06N 3/04 (2006.01)

(52) U.S. Cl.
CPC ......... *G05B 23/024* (2013.01); *G06K 9/6223* (2013.01); *G06N 3/0454* (2013.01)

(58) Field of Classification Search
CPC .............. G05B 23/024; G05B 23/0256; G05B 2219/2637; G06K 9/6223; G06N 3/0454
See application file for complete search history.

(56) References Cited

U.S. PATENT DOCUMENTS 10,354,462 B1  7/2019  Zhang et al.
2016/0093117 A1  3/2016  Ahn et al.
(Continued)

FOREIGN PATENT DOCUMENTS

CN       109116150 A     1/2019
KR    10-2019-0078705 A   7/2019

OTHER PUBLICATIONS

Chunfeng Song, et al., "Auto-encoder Based Data Clustering", Iberoamerican Congress On Pattern Recognition, CIARP: Progress in Pattern Recognition, Image Analysis, Computer Vision, and Applications, Lecture Notes in Computer Science, vol. 8258, 2013, pp. 117-124.

(Continued)

*Primary Examiner* — Mohammad K Islam
(74) *Attorney, Agent, or Firm* — Oblon, McClelland, Maier & Neustadt, L.L.P.

(57) ABSTRACT

A method, system, and non-transitory computer readable medium describing an autoencoder that creates a reduced feature space from healthy power electronics devices for training. Devices under test are then encoded and compared to the encoded features of the healthy devices to determine health of the other devices. Contextual information is used to build multiple models that compare power electronics devices from similarly operated vehicles with one another.

20 Claims, 12 Drawing Sheets

(56) References Cited

U.S. PATENT DOCUMENTS

| | | |
|---|---|---|
| 2018/0276546 A1 | 9/2018 | Joshi et al. |
| 2019/0219994 A1* | 7/2019 | Yan ........................ G05B 17/02 |
| 2019/0242936 A1 | 8/2019 | He et al. |
| 2019/0279443 A1 | 9/2019 | Bharadwaj et al. |
| 2019/0311552 A1 | 10/2019 | Zhang et al. |
| 2021/0081574 A1* | 3/2021 | Chowdhury ........... G06N 20/00 |

OTHER PUBLICATIONS

Andrea Trevino, "Introduction to K-means Clustering", Oracle Data Science Blog, https://blogs.oracle.com/datascience/introduction-to-k-means-clustering, Dec. 6, 2016, 9 pages.

Qinxue Meng, et al., "Relational Autoencoder for Feature Extraction", IEEE International Joint Conference On Neural Networks (IJCNN), May 14-19, 2017, 8 pages.

\* cited by examiner

AUTOENCODER UTILIZING VEHICLE CONTEXTUAL INFORMATION

TECHNICAL FIELD

The present disclosure is directed to identifying maintenance issues of vehicle power modules by using vehicle contextual information in an autoencoder.

BACKGROUND

Power electronic (PE) modules, such as those used in electric or hybrid vehicles, typically operate at high power densities and in high temperature conditions. Thus, PE modules experience a degradation or aging process which can lead to early failure. Basic sensed data such as module current, voltage and temperature, as well as sensed data such as gate signal ON time or duty cycle, can be utilized to detect anomalies (e.g., bond wire failure, die attach failure, substrate delamination), thus predicting the state or potential failure of the PE module. However, without further data analysis of the sensed data, it may be difficult to determine which PE module may be in danger of imminent failure during operation.

Accordingly, it is one object of the present disclosure to provide methods for performing prognostics of PE devices installed in vehicles by utilizing autoencoders trained with datasets including contextual information.

SUMMARY

In an exemplary embodiment, a method for performing prognostics of power electronic (PE) devices installed in vehicles is described, the method comprising generating of training datasets of median ON data of healthy PE devices operated under varying conditions, training an autoencoder, the autoencoder including an encoder, a decoder and a feature space, with the training datasets until there is minimum error between the training datasets and a decoded output of the autoencoder, receiving a first set of encoded features representing the training datasets from a feature space of the encoder, K-means clustering the first set of encoded features to generate clusters representing the various conditions, developing a prognostic for each cluster, storing the prognostic for each cluster, receiving testing datasets of median ON data of a PE device under test, inputting the testing datasets to the encoder, generating a second set of encoded features representing the testing datasets, determining a distance of the second set from each cluster, matching the second set of encoded features to the cluster which is at a minimum distance from the second set, and predicting at least one of a current operating condition and a future operating condition of the PE device under test based on the minimum distance from the cluster.

In another exemplary embodiment, a system for performing prognostics of power electronic (PE) devices installed in vehicles is described, comprising a memory including program instructions, a database, and processing circuitry configured to utilize the program instructions to perform prognostics including generating encoded feature sets from input datasets, clustering the feature sets, storing the clusters in the database, comparing the distances of each feature set from each of the clusters and determining a minimum distance and predicting one or more of a current and a future operating condition of a PE device under test.

In another exemplary embodiment, a non-transitory computer readable medium having instructions stored therein that, when executed by one or more processor, cause the one or more processors to perform a method for performing prognostics of power electronic (PE) devices installed in vehicles is described, the method comprising generating training datasets of median ON data of healthy PE devices operated under varying conditions, training an autoencoder, the autoencoder including an encoder, a decoder and a feature space, with the training datasets until there is minimum error between the training datasets and a decoded output of the autoencoder, receiving a first set of encoded features representing the training datasets from the feature space of the autoencoder, K-means clustering the first set of encoded features to generate clusters representing the varying conditions, developing a prognostic for each cluster, storing the prognostic for each cluster, receiving testing datasets of median ON data of a PE device under test, inputting the testing datasets to the encoder, generating a second set of encoded features representing the testing datasets, determining a distance of the second set from each cluster, matching the second set to the cluster which is at a minimum distance from the second set, and predicting at least one of a current operating condition and a future operating condition of the PE device under test based on the minimum distance from the cluster.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
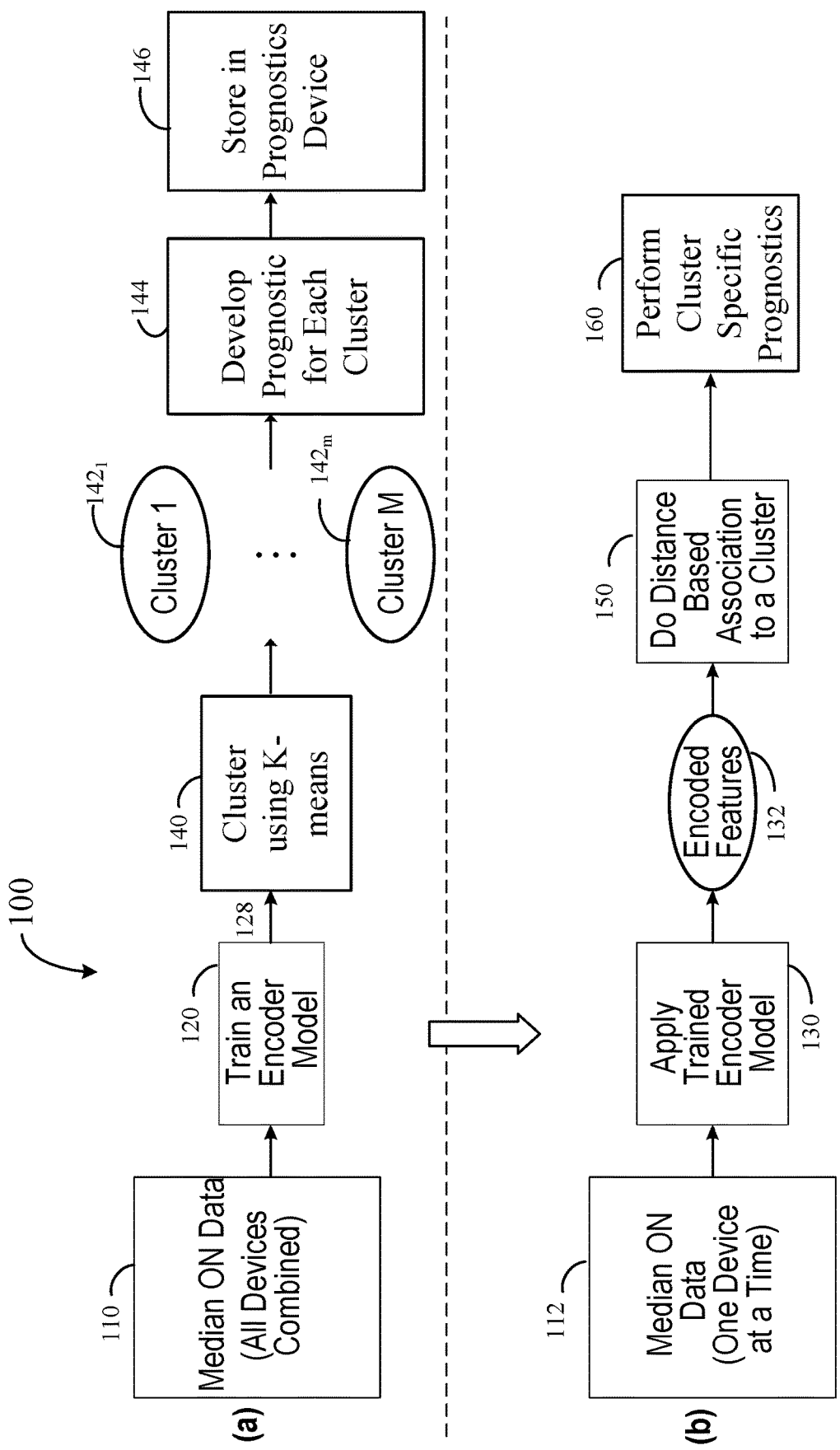
FIG. 1 is an exemplary flowchart of training an autoencoder, according to certain embodiments.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, method and non-transitory computer readable medium having instructions stored therein that, when executed by one or more processor, cause the one or more processors to perform a method for performing prognostics of power electronic (PE) devices installed in vehicles.

The word "module" as defined herein is an electronic circuit within a computing device which may contain a plurality of chips and programming code to operate the module. As such, a module may refer to a section of a processing device or may be a separate device accessible by the processing device.

PE devices may include semiconductor switching devices. Non-limiting examples may include insulated gate bipolar transistors (IGBT), power transistors, bipolar mode static induction transistors, power MOSFETS, and the like.

An "autoencoder" is an unsupervised artificial neural network capable of encoding input data into a reduced feature set. This reduced feature set may then be decoded and read as output. The autoencoder learns how to compress and encode data then learns how to reconstruct the data from the reduced encoded representation back into a representation that is as close to the original input as possible. An autoencoder reduces the data dimensions by learning how to ignore the noise in the data. An autoencoder is trained by a "training set" of data representing having known characteristics.

An autoencoder can be trained with training datasets of "good" data and/or with training datasets representing the operational status of devices which have undergone stress or aging related to elevation gain, weight-on-wheels, mileage, geographic region, climate, urban travel, suburban travel, rural travel, payload, etc.

An autoencoder maps an original data space in a high dimension space to a new space of lower dimensionality which is more suitable for clustering. "Auto" means that this method is unsupervised and "encoder" means it learns another representation of data. The autoencoder network provides a non-linear mapping function by iteratively learning the encoder and the decoder. The encoder is actually the non-linear mapping function, and the decoder demands accurate data reconstruction from the representation generated by the encoder. This process is iterative, which guarantees that the mapping function is stable and effective to represent the original data. The non-linear function in autoencoder is learned by optimizing an objective function.

A one-layer autoencoder network consists of an encoder and a decoder. The encoder maps an input $x_i$ to a hidden representation $h_i$. The mapping function is usually non-linear and represented by:

$$h_i = f(x_i) = \frac{1}{1 + \exp(-(W_1 x_i + b_1))} \quad (1)$$

The decoder seeks to reconstruct the input $x_i$ from its hidden representation $h_i$. The decoder transformation function has a similar formulation:

$$x'_i = g(h_i) = \frac{1}{1 + \exp(-(W_2 h_i + b_2))} \quad (2)$$

where $W_1$ is the encoding weight, $b_1$ is the corresponding bias vector, $W_2$, $b_2$ are the decoding weight and the decoding bias vector respectively.

The autoencoder model aims to learn a useful hidden representation by minimizing the reconstruction error. Thus, given N training samples, the parameters $W_1$, $W_2$, $b_1$ and $b_2$ can be calculated as a result of solving the following equation:

$$\min \frac{1}{N} \sum_{i=1}^{N} \|x_i - x'_i\|^2 \quad (3)$$

An autoencoder is a powerful model to train a mapping function, which ensures the minimum reconstruction error from the code layer to the data layer. Usually, the code layer has less dimensionality than the data layer. Therefore, the autoencoder can learn an effective representation in a low dimensional space, and can be considered a non-linear mapping model. However, an autoencoder contributes little to clustering because it does not pursue that similar input data obtain the same representations in the code layer, which is the nature of clustering. (See Song, C., Liu, F, Huang, Y., Wang, L. Tan, T., "Auto-Encoder Based Data Clustering", J. Ruiz-Shulcloper and G. Sanniti di Baja (Eds.): CIARP 2013, Part I, LNCS 8258, pp. 117-124, 2013, Springer-Verlag Berlin Heidelberg 2013, incorporated herein by reference in its entirety)

The autoencoder includes three parts: an encoder, an encoded feature layer and a decoder. In an initial training phase, "good" data is loaded into the autoencoder and the decoded output is compared to the input. Encoder weights are adjusted until the error between the input and the output is within an error threshold, as selected by the programmer.

In a secondary training phase, the decoder is not used. The training datasets are input to the encoder, where the training datasets are associated with contextual features, such as elevation gain, weight-on-wheels, mileage, geographic region, climate, location or mode of travel (e.g., urban, suburban, rural, payload, etc. The contextual features can be represented by normalized values, so that they are input in a range from zero to one. For example, a climate feature on a sunny day may be zero, on a rainy data may be 0.5, on a snowy day may be 0.8 and in a blizzard may be 1.0.

Aspects of the present disclosure utilize the encoded feature space with K-means clustering to form clusters of data defined by contextual features. The clusters are indicative of the operating points of the PE devices under external operating conditions, such as, but not limited to average drain-source current in MOSFET devices and duration on (ON time). Prognostics of the PE modules under test can be determined by applying data from the test devices to a trained encoder and determining the minimum squared distance of the encoded features to the training clusters. This distance metric can be calculated in many ways, but a popular method is called the Mahalanobis distance.

An aspect of the present disclosure is directed to an autoencoder that receives data sets from healthy PE devices as inputs, trains the encoder on the "good" data and K-means transforms the encoded features into clusters.

In another aspect of the present disclosure, data from a device to be tested is input to the trained autoencoder. The distance of the "testing" features in the encoded space to the "trained" clusters is determined. The test feature is related to the closest "trained" cluster and predictions of future operating conditions can be made by this distance and the characteristics of the "trained" cluster (the associated cluster specific prognostic model in the Prognostics device).

In the training phase, data from a plurality of healthy power modules, having features such as current, voltage, gate signal and device temperature, is concatenated. Data from each ON-cycle for each power module is summarized using the median value of the cycle. For example, for one power module when the power module switch (an IGBT, or MOSFET, or other) conducts current (i.e., turned ON) the median value of the current is computed. At the same time, the same median calculation is done for voltage, gate signal, and device temperature for the same power module. The median values are concatenated sequentially. The process is repeated at a predetermined interval. The process is conducted for other power modules as well. This median data is applied to an autoencoder model as a training set. The encoded data is then clustered by K-means clustering.

K-means clustering is a type of unsupervised learning, which is used for unlabeled data (i.e., data without defined categories or groups). K-means clustering aims to partition n observations into k clusters in which each observation belongs to the cluster with the nearest mean, serving as a prototype of the cluster. The K-means algorithm minimizes the within-cluster variances (squared Euclidean distances). Each data point is iteratively assigned to one of K groups based on features that are provided. Data points are clustered based on feature similarity. The results of K-means clustering are:

i. The centroids of the K clusters, which can be used to label new data.

ii. Labels for the training data (each data point is assigned to a single cluster)

Rather than defining groups before looking at the data, the clustering algorithm finds the clusters and data set labels for a particular pre-chosen K. In order to determine the pre-chosen K, K-means clustering is run for a range of K values and the results are compared. In general, there is no method for determining an exact value of K, but an accurate estimate can be obtained using the following techniques.

One of the metrics that is commonly used to compare results across different values of K is the mean distance between data points and their cluster centroid. The K-means clustering algorithm uses iterative refinement to produce a final result. The algorithm inputs are the number of clusters K and the data set. The data set is a collection of features for each data point. The algorithms start with initial estimates for the K centroids, based on observations of the data set.

The K-means clustering algorithm then iterates between two steps:

1. Data Assignment Step:

Each centroid defines one of the clusters. In this step, each data point is assigned to its nearest centroid, based on the squared Euclidean distance. More formally, if $c_i$ is the collection of centroids in set C, then each data point x is assigned to a cluster based on:

$$\text{argmin } dist(c_i, x), \quad (4)$$

where $c_i$ is a subset of C and where dist(•) is the standard ($L_2$) Euclidean distance. The set of data point assignments for each ith cluster centroid is defined as $S_i$.

2. Centroid Update Step:

In this step, the centroids are recomputed. This is done by taking the mean of all data points assigned to that centroid's cluster, where $|S_i|$ is the cardinality of the $i^{th}$ cluster.

$$c_i = \frac{1}{|S_i|} \Sigma_{x_i \in S_i} x_i \quad (5)$$

The algorithm iterates between steps one and two until a stopping criteria is met (i.e., no data points change clusters, the sum of the distances is minimized, or some maximum number of iterations is reached).

This algorithm converges to a result. The result may be a local optimum (i.e. not necessarily the best possible outcome), meaning that assessing more than one run of the algorithm with randomized starting centroids may give a better outcome.

Each centroid of a cluster is a collection of feature values which define the resulting groups. Examining the centroid feature weights can be used to qualitatively interpret what kind of group each cluster represents.

Figure 2:
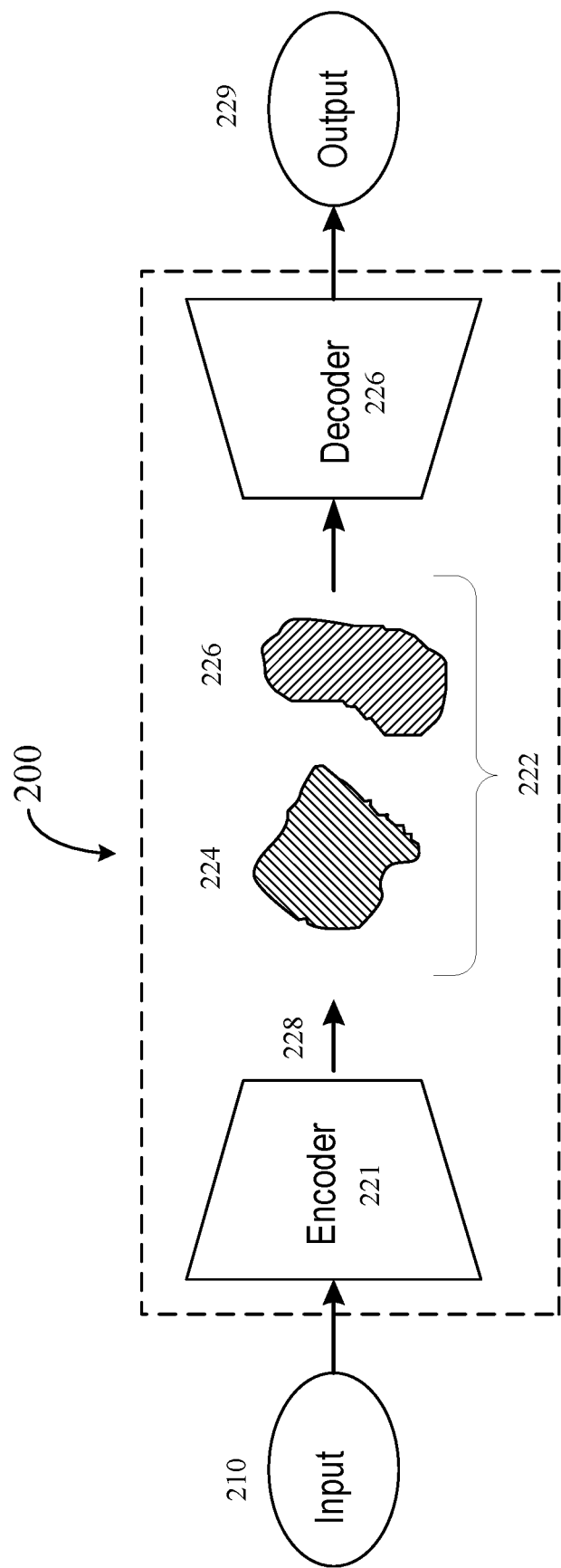
FIG. 2 is an exemplary illustration of an autoencoder, according to certain embodiments.

Turning to FIG. 1, a system 100 for performing prognostics of PE devices is shown. The top flow diagram (a) of FIG. 1 represents the training phase of the autoencoder. The "good behavior" of PE devices can be modeled using the encoded space (222, see FIG. 2) of the autoencoder by plotting the encoded features against one another and observing where the patterns of good behavior lie.

Median "on data" (110) pertains to the behavior of devices being powered ON within a dataset of any suitable size. In one example, this may involve recording a median value for each of the dimensions associated with the device based upon measurements obtained from a plurality of times when the device is on. The training median ON data 110 utilizes the median of a plurality of devices combined.

In step 110, the median of the data for all PE devices combined is calculated, and this median data is applied to train the encoder at step 120. At step 120, the median data from step 110 is input into the encoder and the output, termed encoded features or code, is clustered using K-means at step 140. The output of the K-means calculations is a set of M clusters ($142_1$, $142_2$, . . . , $142_M$). A cluster specific prognostic is developed for each cluster at step 144 and the cluster specific prognostic is stored in the prognostics device at step 146.

The lower flow diagram (b) of FIG. 1 represents the "testing phase". The median data from a single device (step 112) is applied to the trained encoder at step 130. The encoder outputs encoded features at step 132. The encoded features are matched to the closest cluster at step 150 to determine the state of the device. In the "testing phase", the trained encoder is not updated as the trained encoder model is used to determine the cluster that the feature matches most closely. The autoencoder is trained on datasets which represent different operating states of vehicles which have the PE devices installed.

The clusters can be utilized to identify states of operation of the PE device tested in (b) of FIG. 1. The separation between the clusters 1, . . . , M is the result of the K-means clustering. In a non-limiting example, Cluster 1 may represent a set of devices installed in vehicles operating at high speeds, having high mean squared current, high mean squared voltage and high mean squared temperature, designated State 1. Since the set of devices will degrade over time, these parameters will change, and therefore the cluster will "move" in this space. This movement provides a way of "tracking" the age of the device and a means of estimating when the device may fail. Therefore, devices recorded during approximately the same operating condition over a length of time might form different clusters as they age, thereby giving us the means to estimate their age. In this context, it should be noted that the age of the device could be measured by the mileage of the vehicle, which is included as one of the contextual variables. Similarly, another cluster, Cluster 2, may represent a set of devices installed in vehicles operating at low speeds at a constant rate, having high mean squared current, high mean squared voltage and low mean squared temperature. Cluster 2 may be identified as being in State 2 and likely to remain operational for many years. It may be that the PE devices in State 2 may not exhibit as drastic a change in parameters over their lifetimes as devices in State 1. This will become evident during the training of the system because this cluster will not "migrate" as much in the coded space.

As shown in FIG. 1, the training phase (a) shows that K-means clustering (step 140) is used to cluster the encoded features and a prognostic may be developed for each cluster. Thus, features of healthy devices may be determined by the autoencoder.

In a non-limiting example, an input feature set may include four dimensions: gate signal, current, voltage, and temperature of a PE device (e.g., an IGBT, a SiC MOSFET, or other semiconductor transistor). Each time the device is ON, a median value for these variables is recorded (referred to as "median ON" data). This median ON information is then input to the encoder of the autoencoder as training data. Referring to FIG. 1(*a*) and FIG. 2, the autoencoder 200 (at step 210) reduces the data to two dimensions or two sets of encoded features (shown as 224, 226 in feature space 222 of FIG. 2). Thus, the autoencoder provides a non-linear way to reduce to a smaller feature space. The output (228) from the feature space 222 is applied to decoder 226. The decoder converts the two-dimensional feature set back into a representation of the original input data without the noise. The output of the decoder is a reconstruction of the median ON data for all devices combined. During an initial part of the training phase, a "good" training set may be used to calibrate the autoencoder. The input 210 and output 229 are compared and the encoder weights are adjusted until the difference between the input data and the output data is minimized.

Referring back to FIG. 1, in order to test new observed features in other PE devices, or in the same device after aging or a stress condition, where the health is unknown, the trained model developed in the training phase may be used to encode the features of the other PE devices and associate (step 150) the features of the other devices to a cluster found in the training phase (e.g., by the Mahalanobis Distance) as shown in the lower flow diagram of FIG. 1(*b*).

The Mahalanobis distance is the distance between two points in multivariate space. In a regular Euclidean space, variables (e.g. x, y, z) are represented by axes drawn at right angles to each other; the distance between any two points can be measured with a ruler. For uncorrelated variables, the Euclidean distance equals the Mahalanobis distance. However, if two or more variables are correlated as is the median data of the present disclosure, the axes are no longer at right angles, and the measurements become impossible with a ruler. In addition, it is difficult to visualize a space with more than three axes, without making the diagrams very complicated. The Mahalanobis distance measures distances between points, even correlated points for multiple variables. The Mahalanobis distance measures distance relative to the centroid, i.e, a base or central point which can be thought of as an overall mean for multivariate data of the cluster. The centroid is a point in multivariate space where all means from all variables intersect. The larger the Mahalanobis distance, the further away from the centroid the data point is.

The encoded feature space is utilized as a preliminary tool for prognostics (step 160) by grouping data of similar devices (similar current, temperature and duty cycle characteristics) in one cluster. This cluster is then treated as a safe operation area for the devices it encompasses. As such, operating outside the respective cluster is an indication of deviation in behavior of the device. In an example, the data from highly stressed devices will map to a cluster (position, number, centroid distance) which relates to highly stressed training features. If there is information as to the failure of the training data from highly stressed devices, a prediction may be made as to the time to failure of the highly stressed devices.

Figure 3A:
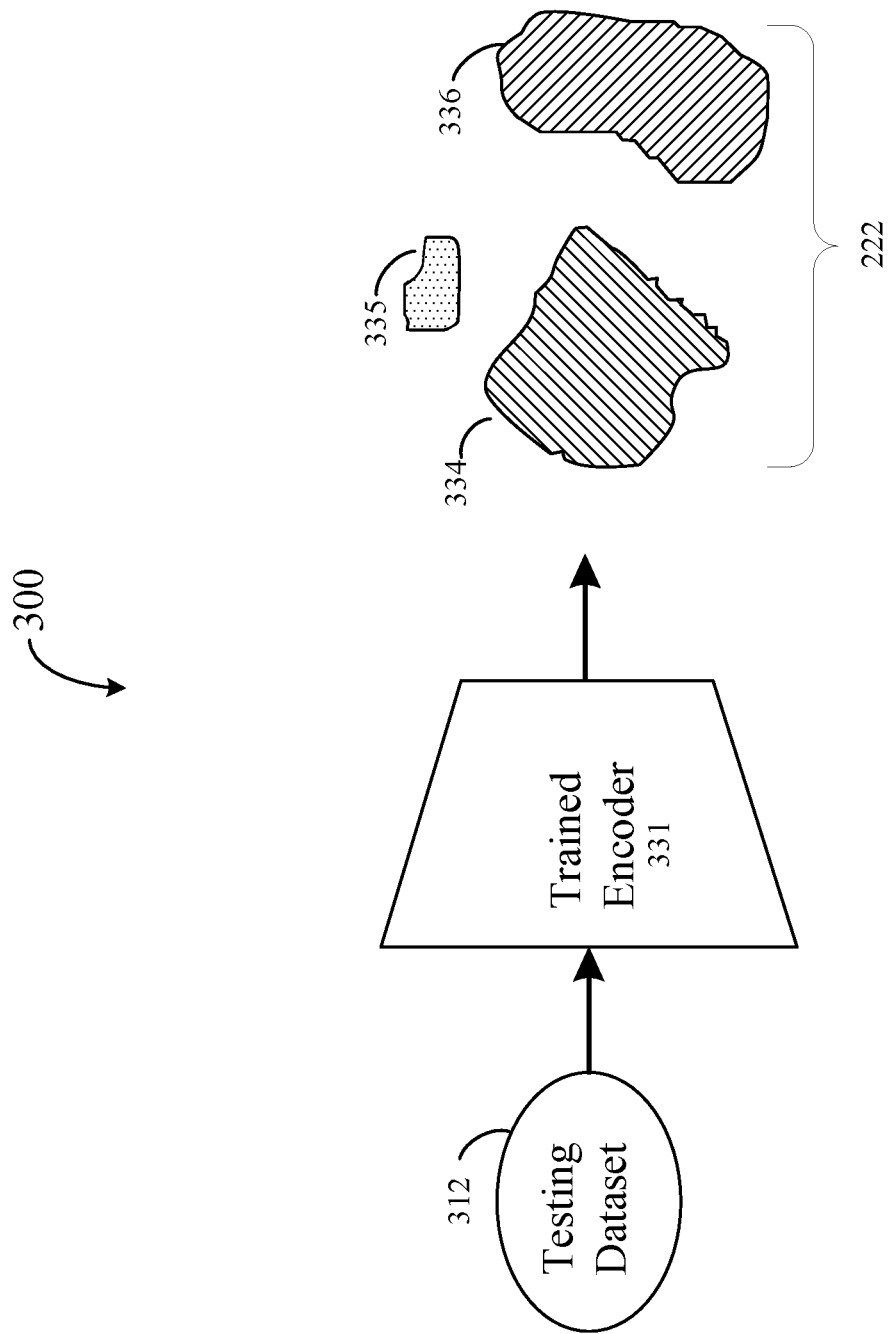
FIG. 3A is an exemplary illustration of testing a device in a trained autoencoder, according to certain embodiments.

Referring to the system 300 of FIG. 3A, a dataset from a device under test is applied to the trained encoder 331. The shape 335 represents encoded data of the device under test. The encoded space 335 is closer to the encoded space 334 than to the encoded space 336 and thus it is a condition that is assumed to be the same as that observed in the encoded space 334.

Devices having clusters far from the clusters of the healthy devices determined in the training phase may be flagged as faulty.

An aspect of the present disclosure regards building trained autoencoders based on contextual information (elevation gain, weight-on-wheels, mileage, geographic region, climate, urban travel, suburban travel, rural travel, payload, etc.). In this way, PE devices within vehicles operating under similar operating parameters may be compared with one another. In an aspect of the present disclosure, an unsupervised learning approach is used to identify vehicles in need of maintenance among a population of identical vehicle models given contextual information (elevation gain, weight-on-wheels, climate, urban travel, suburban travel, rural travel, payload, etc.).

An experiment can be performed using the following steps, for example:

1. Train an autoencoder with state features (based on measurements from the vehicle such as, but not be limited to, drive train measurements) to reconstruct the observed state features.

2. Train an autoencoder using data with latent contextual information (elevation gain, weight-on-wheels, climate, urban travel, suburban travel, rural travel, payload, etc.) not encoded as a feature.

3. Perform K-means clustering on encoded features for identical vehicle models given similar latent context variables to identify outliers in the population.

4. Analytics are performed in a centralized location.

The results indicate that similarly operated PE modules map to the same encoded space. Therefore, autoencoders can be used to perform data association in the presence of latent contextual information.

Figure 3B:
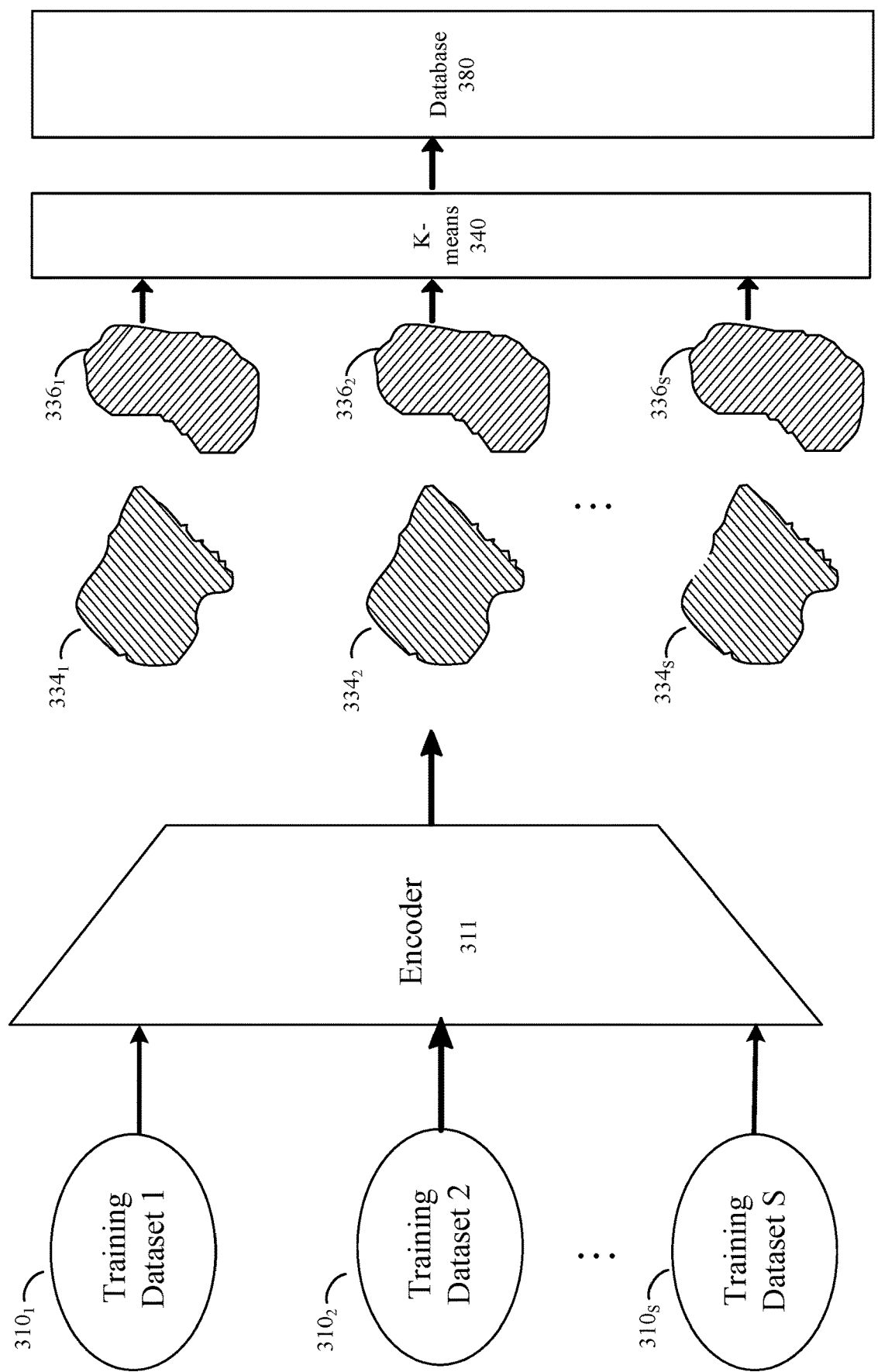
FIG. 3B illustrates training an autoencoder with contextual features, according to certain embodiments.

Referring to FIG. 3B, an encoder is trained by training datasets including latent contextual features. The covariance and mean of each cluster generated after K-means clustering (not shown in FIG. 3B are stored inside database 380 of Prognostics device 338 (see FIG. 3C).

Figure 3C:
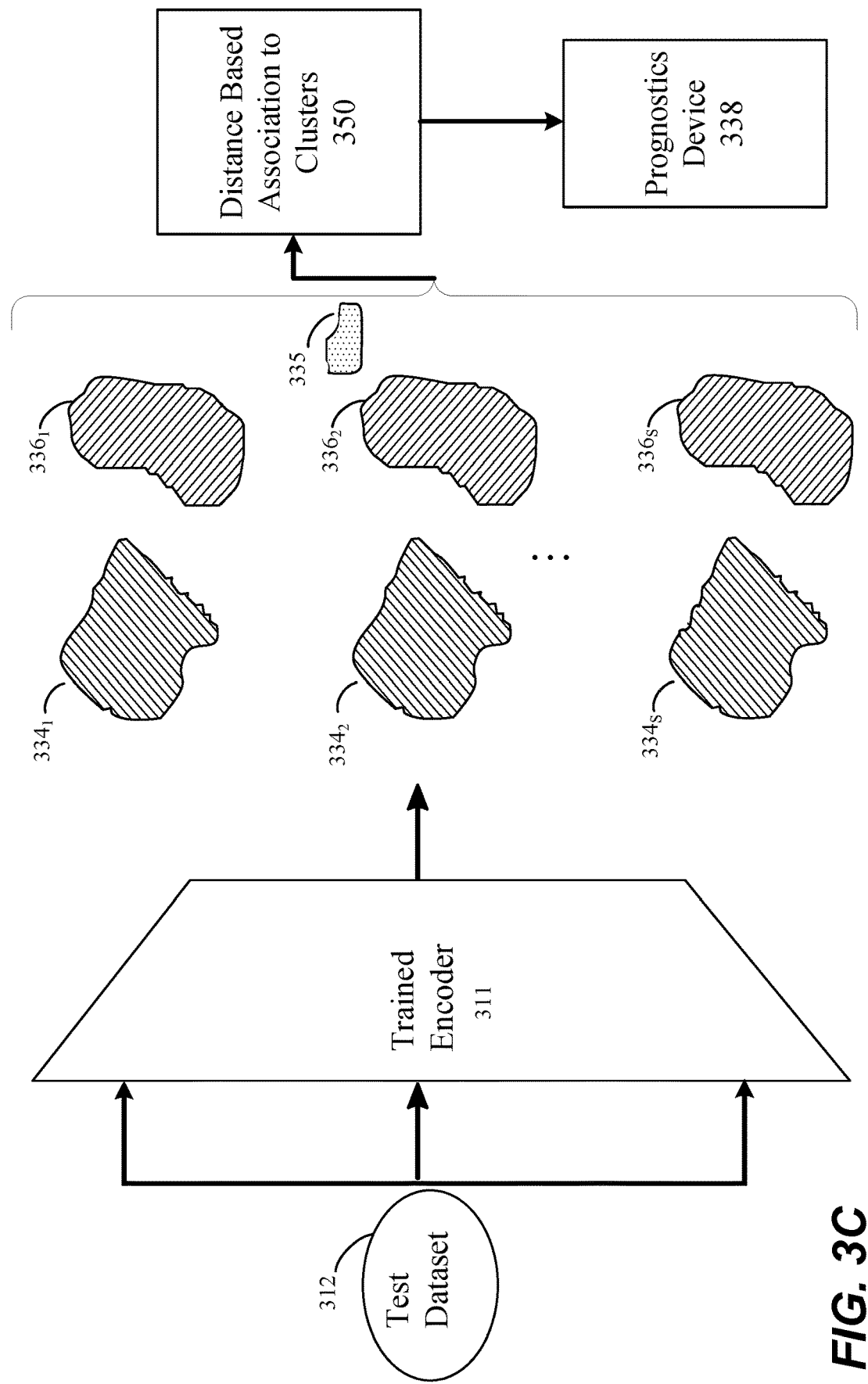
FIG. 3C illustrates applying a test dataset to a trained encoder, according to certain embodiments.

FIG. 3C shows a test dataset 312 applied to the trained encoder of FIG. 3B. The feature set 335 generated is distance matched to the clusters of each trained encoder (stored in the database) at step 350. Prognostics device 338 makes predictions regarding the present and future operating life of the PE module by analyzing the distances of the test feature to each cluster and taking into account the contextual features. The prognostics device is cluster specific in the sense that a prognostic algorithm is developed for each cluster. As described above, different operating conditions will typically result in different clusters. As the devices age, these clusters change position on the cluster map (i.e., the Mahalanobis distance changes). By looking at data from different time periods (as measured, for example, by the mileage of the vehicle) of devices, it is possible to "map" the movement of the devices as they age. This information can be used to predict the aging process and to estimate when a device is likely to fail in normal operation. Age-related deterioration can also be detected by this mapping. Any anomalous failures will be detected by the diagnostics built into the prognostics device and will be indicated by a sudden shift of parameters in the feature space.

Referring again to FIG. 1, groups of PE devices (A Devices, D Devices, E Devices, and F Devices) were operated at different operating parameters as provided below. The dataset numbers refer to data from a particular device, for example, A47 is an A dataset obtained from device 47.

TABLE 1

Experimental Datasets and Latent Contexual Features

| | Dataset (Measurements Only) | | | | Latent Contextual Features | |
|---|---|---|---|---|---|---|
| Observation | Temperature Change ° C. | Avg. Voltage $V_{ds}$ (V) | Avg. Current $I_{ds}$ (A) | On Time (s) | Datasets | Health State of the Device(s) |
| 1 | 1.10 | 2.52 | 151.6 | 2 | A47, A58 | Healthy |
| 2 | 1.07 | 3.10 | 180 | 2 | D80, D81 | Healthy |
| 3 | 1.04 | 2.78 | 165.7 | 5 | E85 | Healthy |
| 4 | 4.04 | 2.7 | 165.7 | 10 | F88 | Healthy |

Figure 4:
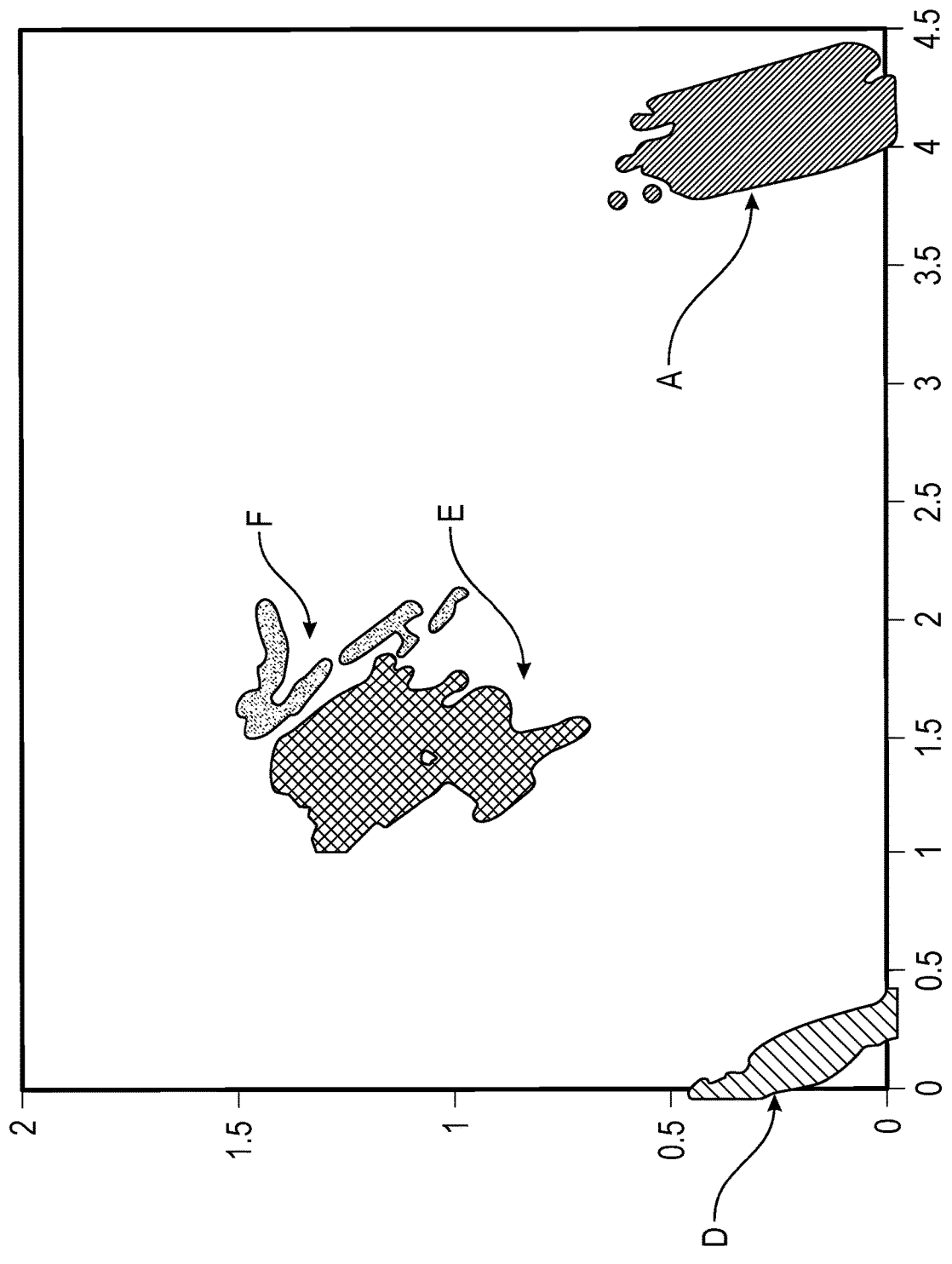
FIG. 4 is a graph of the feature space of the autoencoder, according to certain embodiments.

An autoencoder as described above was used to map the input features into a two-dimensional space. As shown in FIG. 4, groups of encoded features were formed by the encoder in the feature space (222 of FIG. 2). The A devices are represented by lines slanting right, the D devices by lines slanting left, the E features by crosshatching and the F Devices by dots. The horizontal and vertical axes are labelled by code values of the feature sets. The horizontal axis label is "code value 1", and the vertical axis label is "code value 2", where the output of the encoder is (x, y) code points. This map shows that similarly operated devices map to the same area of the encoded space. Code value 1, horizontal axis, represents the change in currents ($I_{DS}$) of the devices. It can be noted that D devices have the highest current (180 A) and A devices have the lowest current (151.6 A), thus code value 1 represents decreasing current from left to right. Code value 2, vertical axis, represents increasing ON time. As can be seen on Table 1, A and D devices are ON for 2 seconds, but E devices are ON for 5 seconds and F devices are ON for 10 seconds. FIG. 4 depicts the mapping of the clusters based on Feature 2. The E and F devices are at higher positions in the Y direction than the A and D devices. The F devices, ON for 10 seconds are mapped higher than the E devices, which are ON for 5 seconds.

The information provided from the above figure can be used to create more models for further prognostics (Prognostics Device 338). For instance, an autoencoder can be trained on only E and F Devices since they are in the same cluster.

Newly acquired data from the same PE devices which gets associated to this cluster can be tested using Prognostics Device 338 and the autoencoder specific to that cluster.

Figure 5:
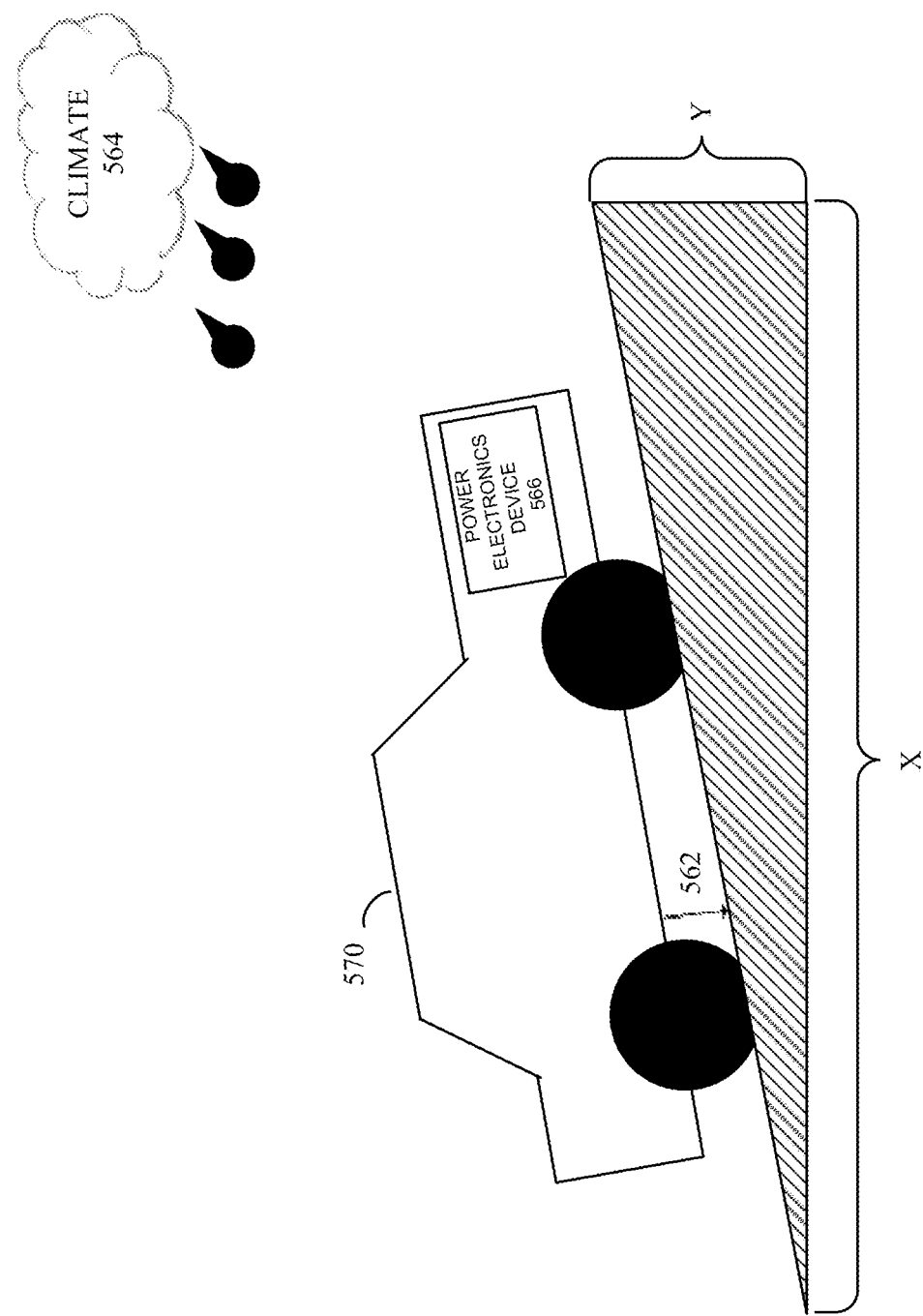
FIG. 5 illustrates some contextual features, according to certain embodiments.

In practice, encoding contextual features as mentioned above (e.g., elevation gain, weight-on-wheels, mileage, geographic region, climate, urban travel, suburban travel, rural travel, payload, etc.) in the training of the autoencoders, then the resulting encoded observations can be clustered as done in FIG. 3A. Encoding contextual features and using them to train the autoencoder reduces the number of latent contextual features. The observations in a cluster can be used to form a model as done in FIG. 4, and anomaly detection may be performed. The expected number of clusters will increase. Thus, an encoder that applies contextual information may be used to evaluate similarly operated vehicles for potential maintenance issues. Data from a vehicle operating over time may be collected and applied to an encoder specifically trained on the vehicles operating parameters (as a cluster specific prognostic algorithm in the Prognostics Device 338). For example, a contextual feature representing the elevation gain of a vehicle could be measured and used as contextual information as shown in FIG. 5. Encoding the elevation gain, or in general any contextual feature, is performed by representing this feature as a discrete or continuous number between zero and one, where the current elevation gain is scaled by its maximum and minimum potential. For example, a vehicle 570 may drive on relatively flat terrain and then head up mountains. The data from the vehicle while driving on flat terrain may be automatically input to a prognostics model that is different from a prognostics model associated with elevation gain (climbing) via steps 112-160 (FIG. 1). FIG. 5 also shows that a first contextual feature may be elevation gain (Y/X), a second may be weight on wheels 562, a third may be climate 564 and a fourth may be cycles since restart (not shown in FIG. 5).

Table 2 represents datasets collected from PE modules in vehicles operating under these contextual features can be applied to the trained autoencoder(s) to determine diagnostics such as time to failure, aging, need for module cooling (such as by increasing a fan or opening a coolant flow valve), etc.

TABLE 2

Contextual Features for FIG. 5

| | Dataset (Measurement & Contextual Features) | | | | | | Latent Contextual Feature |
|---|---|---|---|---|---|---|---|
| | Measurements | | | Contextual Features | | | |
| Observation | Temperature Change (° C.) | Avg. Voltage $V_{ds}$ (V) | Avg. Current $I_{ds}$ (A) | Elevation gain | Weight on wheels | IECC Climate Region | Device Health Factors |
| 1 | 1.5 | 29 | 99 | 1 | 10k | 5 | Healthy |
| 2 | 2 | 31 | 110 | 1.2 | 10.2k | 5 | Degraded |
| 3 | 2.2 | 33 | 130 | 5 | 10.2k | 5 | Degraded |
| . | . | . | . | . | . | . | . |
| . | . | . | . | . | . | . | . |
| . | . | . | . | . | . | . | . |

The contextual variables can be encoded between 0 and 1 by using various approaches. For example, the cycle since restart can be converted to a continuous value between 0 and 1 by the transform:

$$z = 1 - \exp(-\text{cycle since restart}/\tau), \quad (5)$$

where $\tau > 0$ is a time constant to be determined.

From FIG. 5 and Table 2, the first contextual feature is elevation gain, which is calculated as Y/X. The second contextual feature of weight on wheels is shown as 562 and the third contextual feature of climate change is shown as 564. A PE device 566 is shown installed in the vehicle 570. The PE device will be affected by the contextual features. For example, elevation gain of the vehicle may cause the vehicle temperature to rise, aging the PE device. A heavy payload indicated by weight on wheels 562 may create drag between the tires and the road surface, which may cause the vehicle to work harder and generating a higher engine temperature, higher current or longer ON duty cycle of the PE device. Rain, snow and sleet may cause cooling of the engine and thus the PEs device whereas high climate temperatures may heat the engine compartment of the vehicle, which may affect the lifetime or aging of the PE device stored therein.

Figure 6:
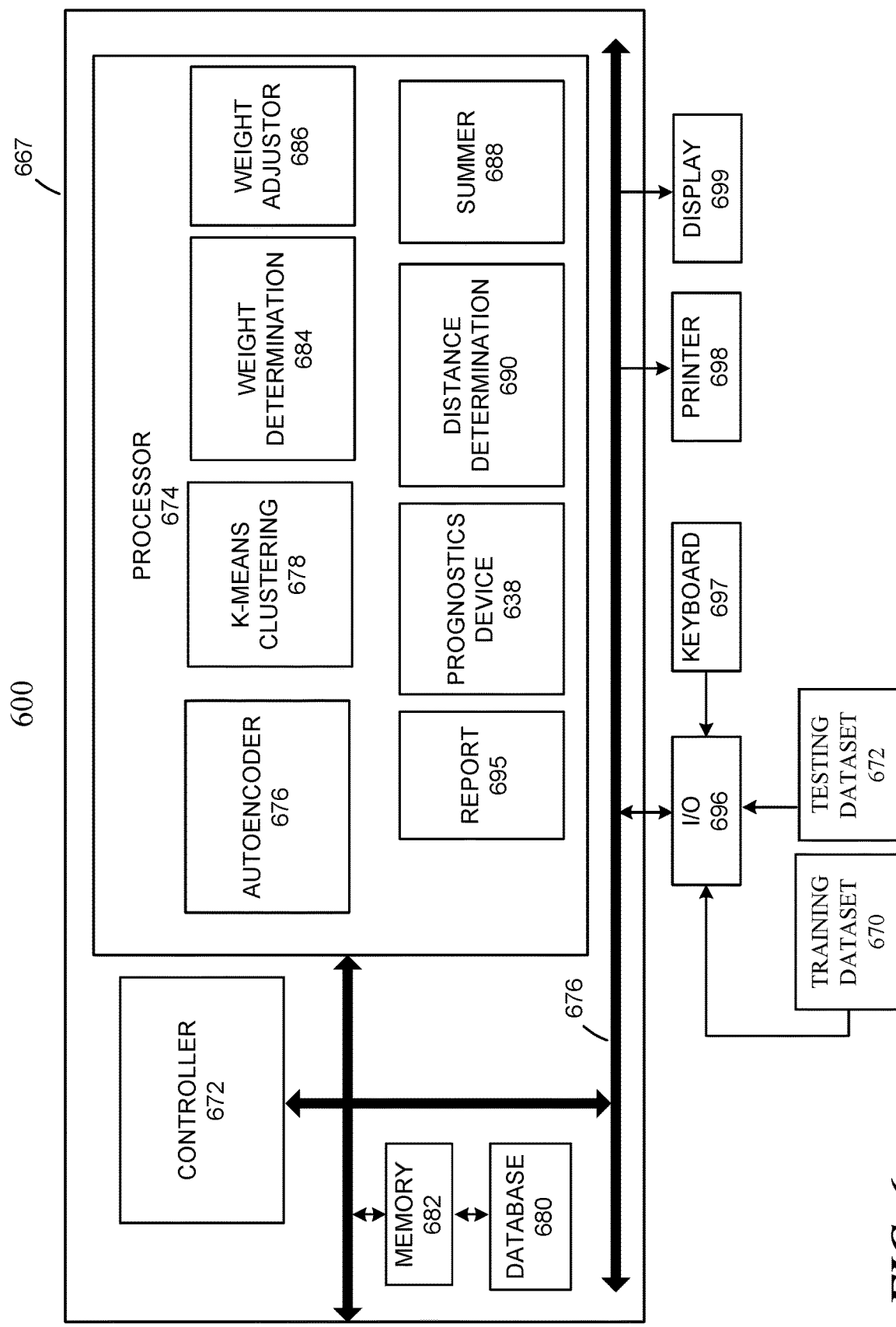
FIG. 6 illustrates the computing system for training the autoencoders and performing the prognostics.

FIG. 6 shows the computing environment of the present disclosure. The computing environment includes a computing device 667 operatively connected to a plurality of input/output devices, such as I/O port 696, keyboard 697, printer 698 and display 699. The I/O port is configured to receive either of a training dataset 670 or a testing dataset 672. The I/O port may also be configured to receive inputs from a keyboard, such as the value of K needed in the K-means clustering module 678. The computing device 667 includes a controller 672, at least one processor 674, the processor including an autoencoder 676, a K-means clustering device 678, a database 680, a memory 682, a weight determination device 684, a weight adjusting device 686, a summer 688, a distance determination device 690 configured to determine the Mahalanobis distance of a set of encoded features to a cluster, a prognostics device 638, and a reporting device 695. The computing device is configured to build the trained autoencoder modules, calibrate the autoencoder by determining and adjusting the weights, perform K-means clustering of the encoded training features, store the clusters, their operating conditions and contextual features in the database, determine the minimum distance of testing encoded features to a cluster, generate prognostics for a PE device under test and report the prognostics.

In summary, one of the main aspects of the present disclosure is an autoencoder that creates a reduced feature space from datasets sourced from healthy PE devices. Datasets from devices under test are then encoded and compared to the clusters of the healthy devices to determine the closest observed cluster. Each cluster is associated with a prior prognostics model from a collection of prognostics models in the prognostics device. The process described by FIG. 3B, 3C is automatic data association in the presence of latent contextual information paired with cluster specific prognostics. This approach is necessary to infer the health of the PE elements under the influence of latent contextual variables. Encoding contextual variables is possible and reduces the number of latent contextual variables.

The first embodiment is illustrated with respect to the FIG. 1-6. The first embodiment describes a method for performing prognostics of power electronic (PE) devices installed in vehicles, comprising generating training datasets of median ON data (step 60) of healthy PE devices operated under varying conditions, training (step 140) an autoencoder (200), the autoencoder including an encoder (231), a decoder (226) and a feature space (222), with the training datasets until there is minimum error between the training datasets and a decoded output (229) of the autoencoder, receiving a first set of encoded features (224 or 226) representing the training datasets from a feature space (222) of the autoencoder, K-means clustering (step 140) the first set of encoded features to generate clusters ($142_1$, $142_2$, . . . , $142_m$) representing the varying conditions, developing a prognostic for each cluster, storing the prognostic for each cluster, receiving testing datasets (112) of median ON data of a PE device under test, inputting the testing datasets to the trained encoder (step 130), generating a second set of encoded features (step 132) representing the testing datasets, determining a set of distances of each set of encoded features from each cluster (step 150), matching the second set of encoded features to the cluster which is at a minimum distance from the second set of encoded features, and predicting (step 160) current and future operating conditions of the PE device under test based on the minimum distance from the cluster and its contextual feature.

The PE device may be a power transistor and the conditions are varied by are at least one of varying a drain-source current applied to the power transistor, varying a voltage of the power transistor, varying a duty cycle of the power transistor, and varying the temperature of the power transistor.

The power transistor is at least one of a metal oxide silicon field effect transistor (MOSFET), an insulated gate bipolar transistor (IGBT), and a silicon carbide transistor.

The method further comprises training the autoencoder with a plurality of training datasets ($310_1$, $310_2$, . . . , $310_S$, FIG. 3B) of median ON data of healthy PE devices, the datasets each operated under varying conditions and each generated by a different latent contextual feature; K-means clustering (step 140) each first set of encoded features to generate clusters representing the various conditions and each different contextual feature, and storing the clusters of each autoencoder in a database 380 with the latent contextual feature for each cluster.

The method includes inputting the testing datasets to the encoder, determining the set of distances of a second set of encoded features from each cluster in the database, matching the second set of encoded features to the cluster in the database which is at a minimum distance from the second set of encoded features, and predicting current and future operating conditions of the PE device under test based on the minimum distance from the cluster and its latent contextual feature.

In the method, the latent contextual features further comprise operating conditions of a vehicle in which a PE device is installed, wherein the operating conditions include any one of a weight on a set of wheels of the vehicle, elevation gain of the vehicle over a time period, a mileage of the vehicle, a geographic region in which the vehicle travels, a climate in which the vehicle travels, urban travel of the vehicle, suburban travel of the vehicle, rural travel of the vehicle, payload of the vehicle, vehicle manufacturer and model, a road speed of the vehicle, maintenance of the vehicle, and the like.

The method further includes determining the set of distances of the second set of encoded features to each cluster by calculating the Mahalanobis distance of each of the encoded features to a centroid of each cluster.

In the method, K-means clustering the first set of encoded features to generate clusters representing the various conditions further comprises inputting a value of K to a K-means clustering device, inputting the first set of encoded features to the K-means clustering device, each of the first set of encoded features including a set of data points associated with the encoded feature, estimating centroids of each set of data points, determining the distance of each data point of the set of data points from the estimated centroids, summing the distances to the estimated centroid, iteratively re-estimating the centroids, re-determining the distance of each data point of the set of data points from the re-estimated centroids, re-summing the distances to the re-estimated centroid until the sum of the distances does not change from the sum of the distances of a previous iteration.

The second embodiment is illustrated by FIGS. 1-6. The second embodiment describes a system for performing prognostics of power electronic (PE) devices installed in vehicles (such as vehicle 1070, FIG. 10), the system comprising a memory 682 including program instructions, a database 680, and processing circuitry 674 configured to utilize the program instructions to perform prognostics, including generating encoded feature sets from input datasets, clustering the feature sets, storing the clusters in the database, comparing the distances of each feature set from each of the clusters and determining a minimum distance, and predicting one or more of a current and a future operating conditions of a PE device under test.

The PE device is a power transistor comprising least one of a metal oxide silicon field effect transistor (MOSFET), an insulated gate bipolar transistor (IGBT), and a silicon carbide transistor.

The processing circuitry is further configured to decode the encoded feature sets, determine a calibration difference between the encoded feature sets and the input datasets; and adjust the calibration difference until the calibration difference is below a threshold.

The processing circuitry is further configured to train a plurality of training datasets of median ON data of healthy PE devices each operated under varying conditions and representing a different latent contextual feature; and generate an encoded feature set ($334_1$, $336_1$ to $334_S$, $334_S$) representing the varying conditions and the latent contextual feature.

The processing circuitry is further configured to cluster each set of encoded features to generate clusters representing the various conditions and the latent contextual feature and the database is further configured to store the clusters with the latent contextual feature for each cluster.

The processing circuitry is further configured to receive a set of encoded features generated by the encoders and to determine the minimum distance of each encoded feature to one of the clusters stored in the database.

The processing circuitry is further configured to predict the current and future operating conditions of a PE device under test based on the minimum distance and the latent contextual feature.

The third embodiment is illustrated with respect to FIGS. 1-15. The third embodiment describes a non-transitory computer readable medium having instructions stored therein that, when executed by one or more processor, cause the one or more processors to perform a method for performing prognostics of power electronic (PE) devices installed in vehicles, comprising generating training datasets of median ON data (step 60) of healthy PE devices operated under varying conditions, training (step 140) an autoencoder (200), the autoencoder including an encoder (231), a decoder (226) and a feature space (222), with the training datasets until there is minimum error between the training datasets and a decoded output (229) of the autoencoder, receiving a first set of encoded features (224 or 226) representing the training datasets from a feature space (222) of the autoencoder, K-means clustering (step 140) the first set of encoded features to generate clusters ($142_1$, $142_2$, . . . , $142_m$) representing the varying conditions, developing a prognostic for each cluster, storing the prognostic for each cluster, receiving testing datasets (112) of median ON data of a PE device under test, inputting the testing datasets to the trained encoder (step 130), generating a second set of encoded features (step 132) representing the testing datasets, determining a set of distances of each set of encoded features from each cluster (step 150), matching the second set of encoded features to the cluster which is at a minimum distance from the second set of encoded features, and predicting (step 160) current and future operating conditions of the PE device under test based on the minimum distance from the cluster and its contextual feature.

The non-transitory computer readable medium method further comprises training the autoencoder with a plurality of training datasets ($310_1$, $310_2$, . . . , $310_S$, FIG. 3B) of median ON data of healthy PE devices, the datasets each operated under varying conditions and each generated by a different latent contextual feature; K-means clustering (step 140) each first set of encoded features to generate clusters representing the various conditions and each different contextual feature, and storing the clusters of each autoencoder in a database 380 with the latent contextual feature for each cluster.

The non-transitory computer readable medium method includes inputting the testing datasets to the encoder, determining the set of distances of a second set of encoded features from each cluster in the database, matching the second set of encoded features to the cluster in the database which is at a minimum distance from the second set of encoded features, and predicting current and future operating conditions of the PE device under test based on the minimum distance from the cluster and its latent contextual feature.

Figure 7:
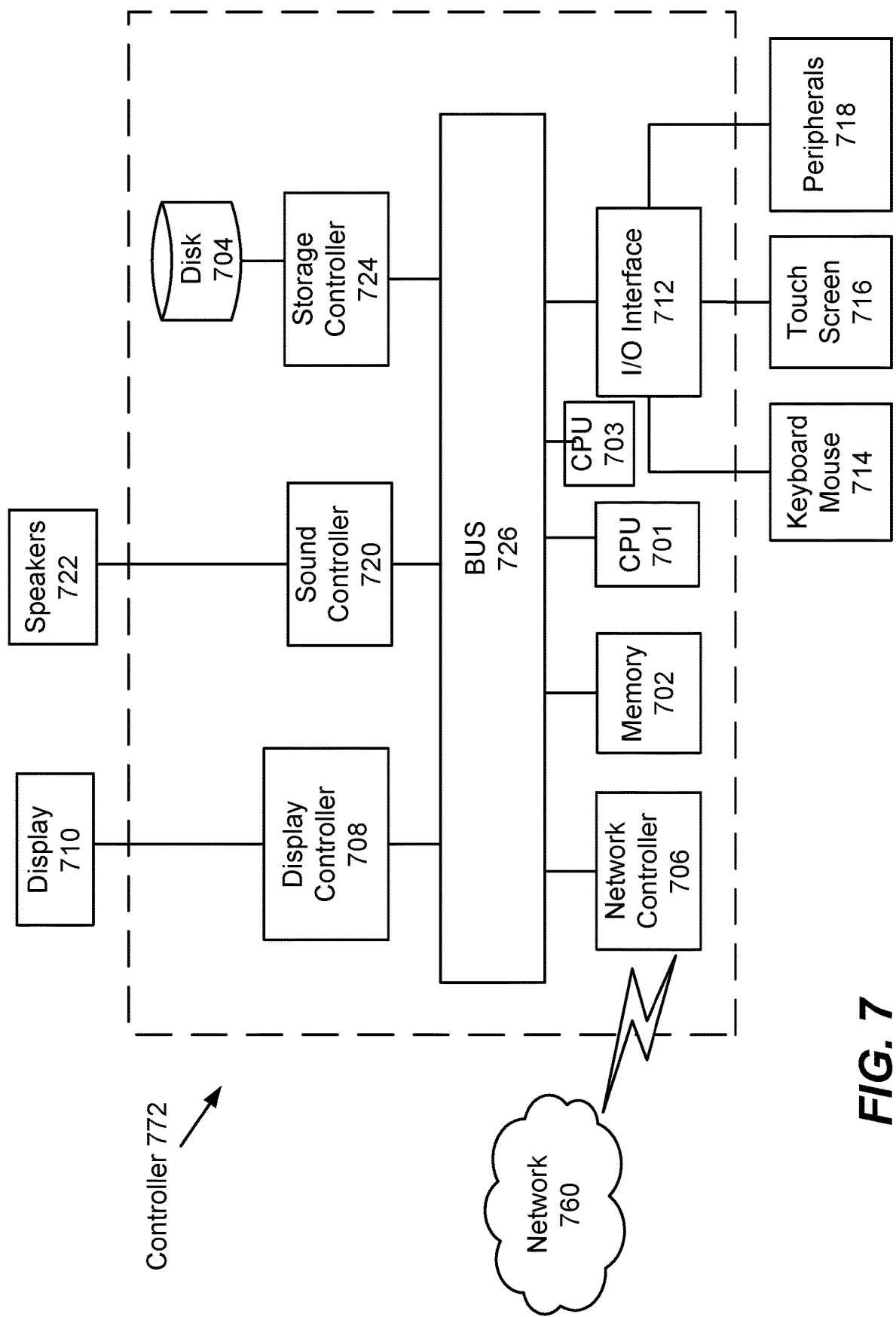
FIG. 7 is an illustration of a non-limiting example of details of computing hardware used in the computing system, according to certain embodiments.

Next, further details of the hardware description of the computing environment including a computing system as shown in FIG. 6 according to exemplary embodiments is described with reference to FIG. 7. In FIG. 7, a controller 772 is described is representative of the autoencoder system in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 77 interfaces with a keyboard and/or mouse 79 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
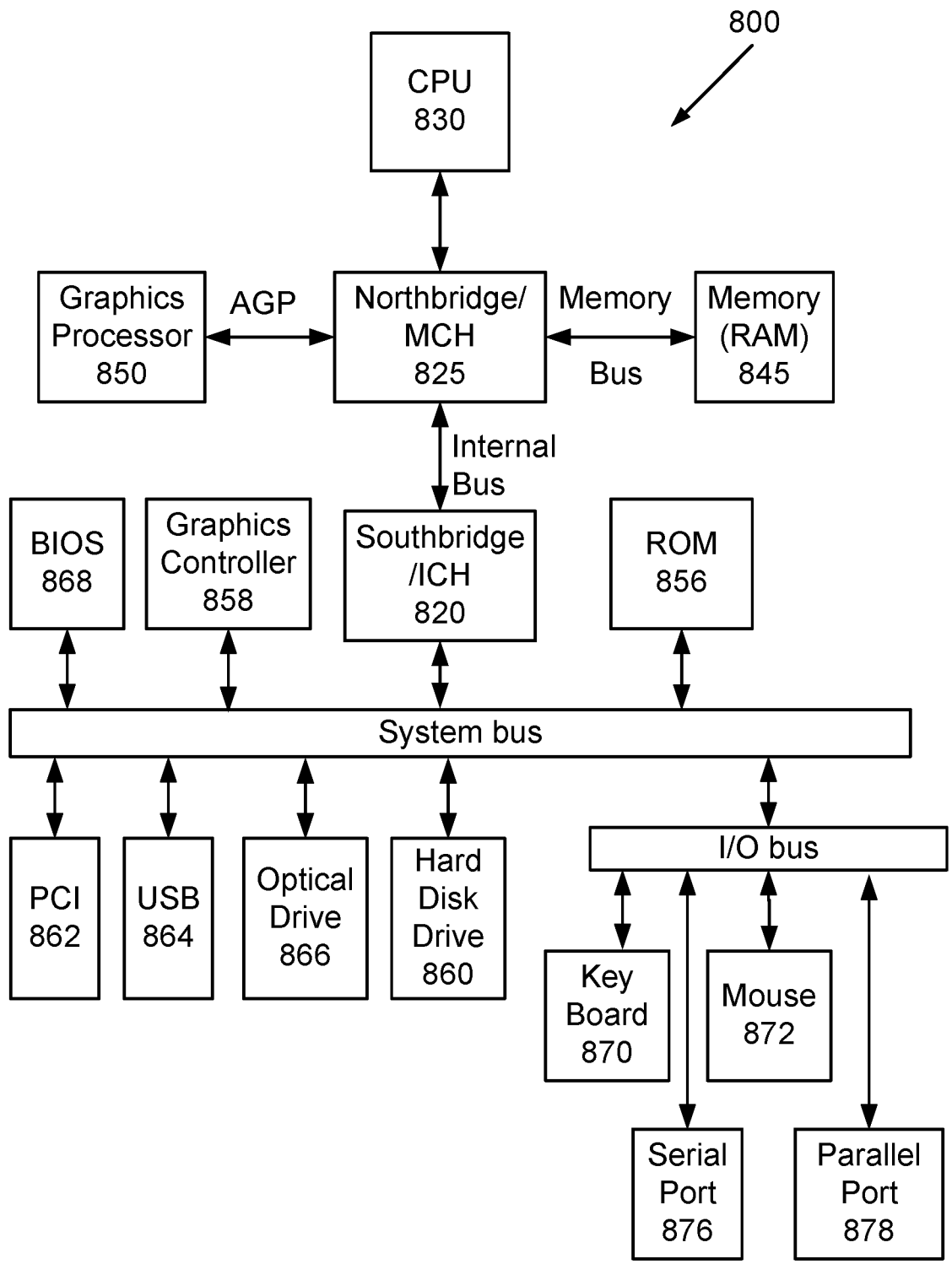
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
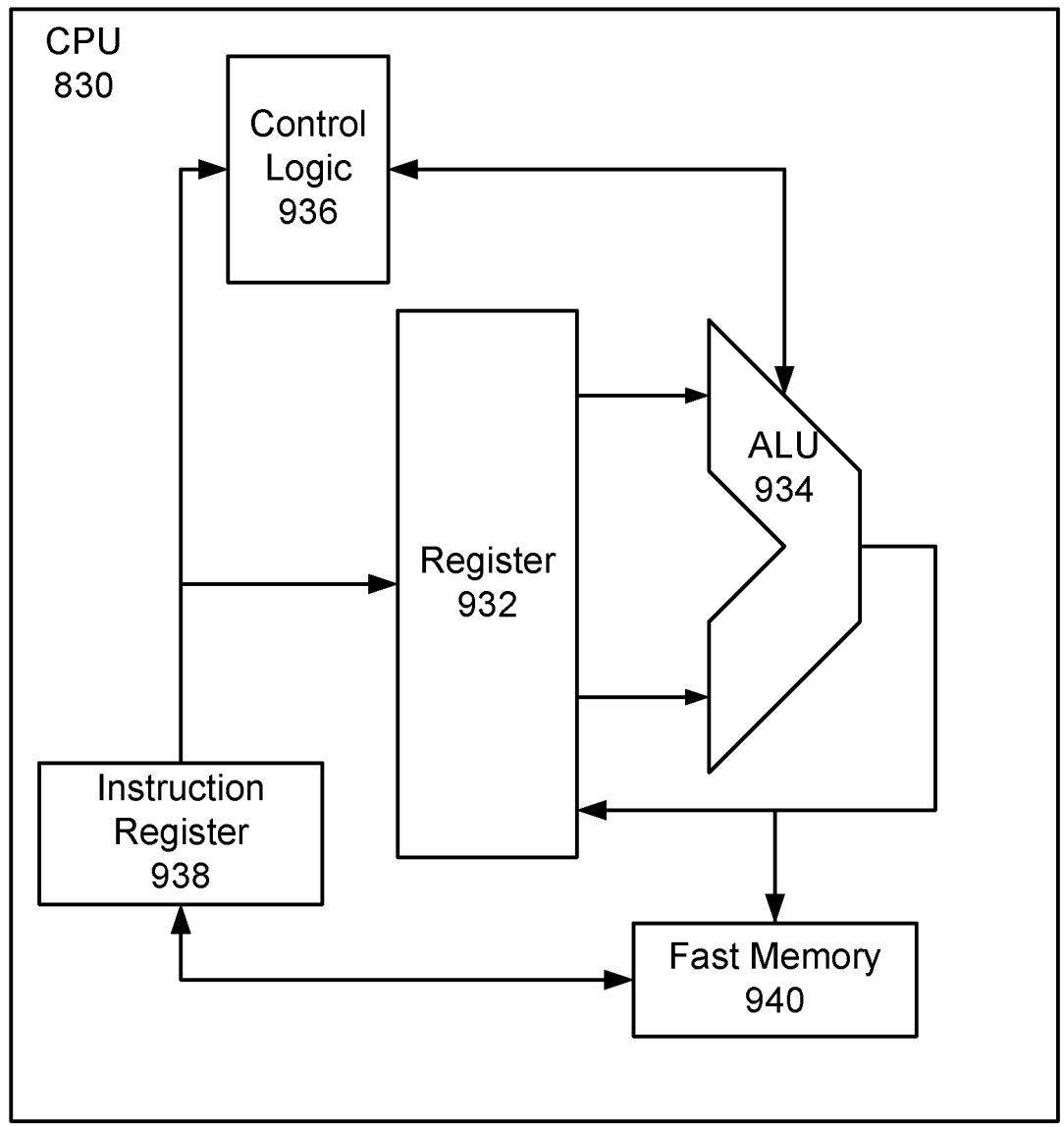
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 730. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
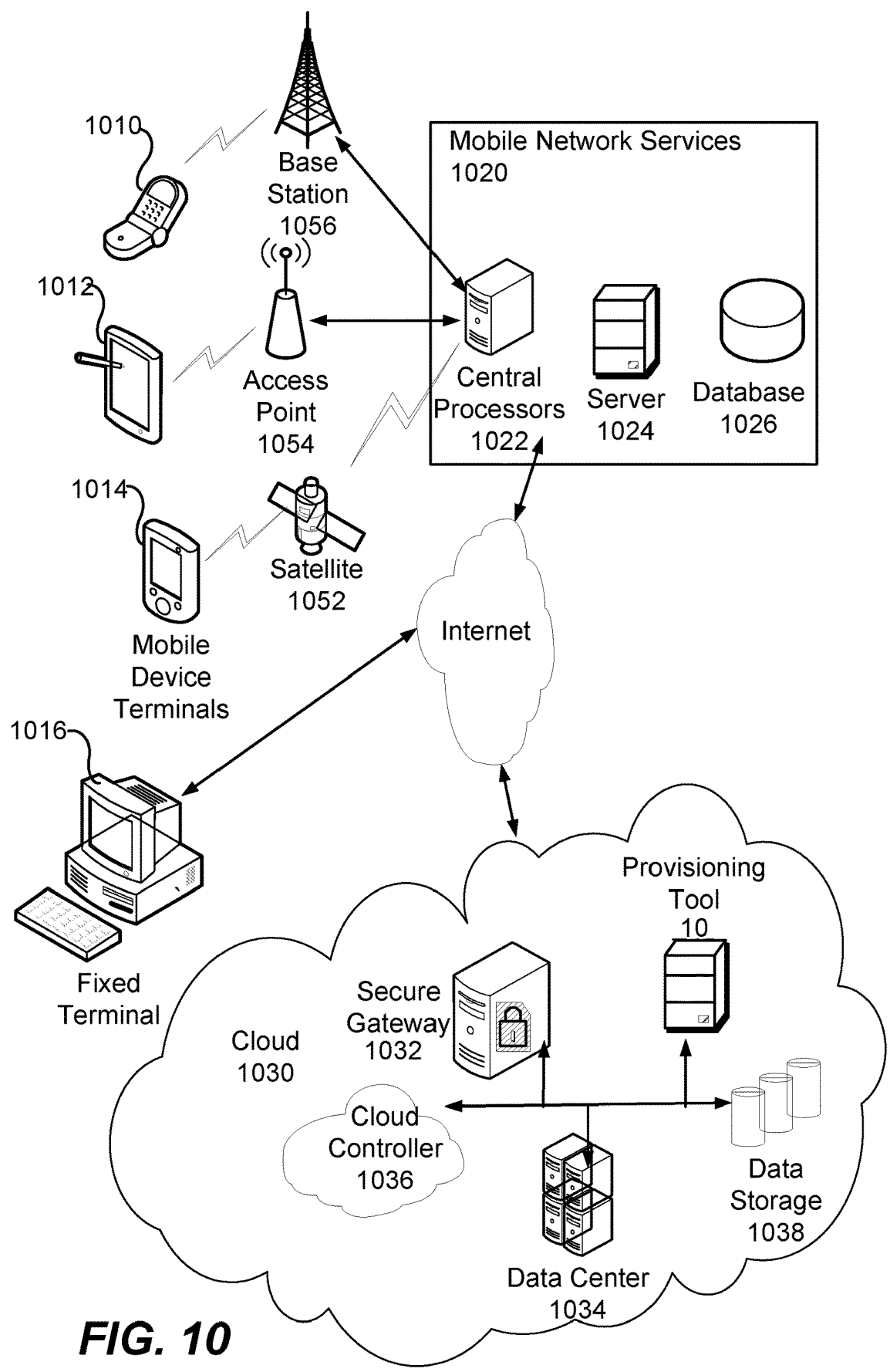
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for performing prognostics of power electronic (PE) devices installed in vehicles, comprising:
generating training datasets of median ON data of healthy PE devices operated under varying conditions;
training an autoencoder, the autoencoder including an encoder, a decoder and a feature space, with the training datasets until there is minimum error between the training datasets and a decoded output of the autoencoder;
receiving a first set of encoded features representing the training datasets from the feature space of the autoencoder;
K-means clustering the first set of encoded features to generate clusters representing the varying conditions;
developing a prognostic for each cluster;
storing the prognostic for each cluster;
receiving testing datasets of median ON data of a PE device under test;
inputting the testing datasets to the encoder;
generating a second set of encoded features representing the testing datasets;
determining a distance of the second set from each cluster;
matching the second set to the cluster which is at a minimum distance from the second set; and
predicting at least one of a current operating condition and a future operating condition of the PE device under test based on the minimum distance from the cluster.

2. The method of claim 1, wherein the PE device is a power transistor and the conditions are varied by are at least one of:
varying a drain-source current applied to the power transistor;
varying a voltage of the power transistor;
varying a duty cycle of the power transistor; and
varying the temperature of the power transistor.

3. The method of claim 2, wherein the power transistor is at least one of:
a metal oxide silicon field effect transistor (MOSFET);
an insulated gate bipolar transistor (IGBT); and
a silicon carbide transistor.

4. The method of claim 1, further comprising:
training the autoencoder with a plurality of training datasets of median ON data of healthy PE devices, the datasets each operated under varying conditions and each generated by a different latent contextual feature;
K-means clustering each first set of encoded features to generate clusters representing the varying conditions and a different latent contextual feature;
storing the clusters of each encoder in a database with the latent contextual feature for each cluster.

5. The method of claim 4, further comprising:
inputting the testing datasets to the autoencoder;
determining the set of distances of a second set of encoded features from each cluster in the database;
matching the second set of encoded features to the cluster in the database which is at a minimum distance from the second set of encoded features; and
predicting current and future operating conditions of the PE device under test based on the minimum distance from the cluster and its latent contextual feature.

6. The method of claim 5, the latent contextual features further comprising operating conditions of a vehicle in which a PE device is installed, wherein the operating conditions include any one of:
a weight on a set of wheels of the vehicle;
elevation gain of the vehicle over a time period;
a mileage of the vehicle;
a geographic region in which the vehicle travels;
a climate in which the vehicle travels;
urban travel of the vehicle;
suburban travel of the vehicle;
rural travel of the vehicle;

payload of the vehicle;
vehicle manufacturer and model;
a road speed of the vehicle;
maintenance of the vehicle;
and the like.

7. The method of claim 1, further comprising:
determining the set of distances of the second set of encoded features to each cluster by calculating the Mahalanobis distance of each of the encoded features to a centroid of each cluster.

8. The method of claim 1, wherein K-means clustering the first set of encoded features to generate clusters representing the various conditions further comprises:
inputting a value of K to a K-means clustering module;
inputting the first set of encoded features to the K-means clustering module, each of the first set of encoded features including a set of data points associated with the encoded feature;
estimating centroids of each set of data points;
determining the distance of each data point of the set of data points from the estimated centroids;
summing the distances to the estimated centroid;
iteratively re-estimating the centroids, re-determining the distance of each data point of the set of data points from the re-estimated centroids; re-summing the distances to the re-estimated centroid until the sum of the distances does not change from the sum of the distances of a previous iteration.

9. A system for performing prognostics of power electronic (PE) devices installed in vehicles, comprising:
a memory including program instructions;
a database; and
a processing circuitry configured to:
generate training datasets of median ON data of healthy PE devices operated under varying conditions;
train an autoencoder, the autoencoder including an encoder, a decoder and a feature space, with the training datasets until there is minimum error between the training datasets and a decoded output of the autoencoder; receiving a first set of encoded features representing the training datasets from the feature space of the autoencoder;
generate clusters representing the varying conditions based on K-means clustering the first set of encoded features;
develop a prognostic for each cluster; storing the prognostic for each cluster; receiving testing datasets of median ON data of a PE device under test;
input the testing datasets to the encoder;
generate a second set of encoded features representing the testing datasets;
determine a distance of the second set from each cluster;
match the second set to the cluster which is at a minimum distance from the second set; and
predict at least one of a current operating condition and a future operating condition of the PE device under test based on the minimum distance from the cluster.

10. The system of claim 9, wherein the PE device is a power transistor comprising least one of:
a metal oxide silicon field effect transistor (MOSFET);
an insulated gate bipolar transistor (IGBT); and
a silicon carbide transistor.

11. The system of claim 9, wherein the processing circuitry is further configured to:
decode the encoded feature sets.

12. The system of claim 11, wherein the processing circuitry is further configured to:
determine a calibration difference between the encoded feature sets and the input datasets; and
adjust the calibration difference until the calibration difference is below a threshold.

13. The system of claim 12, wherein the processing circuitry is further configured to:
train a plurality of training datasets of median ON data of healthy PE devices each operated under varying conditions and representing a different latent contextual feature; and
generate an encoded feature set representing the varying conditions and the latent contextual feature.

14. The system of claim 13, wherein the processing circuitry is further configured to:
cluster each set of encoded features to generate clusters representing the various conditions and the latent contextual feature.

15. The system of claim 14, further comprising:
wherein the database is further configured to store the clusters with the latent contextual feature for each cluster.

16. The system of claim 15, wherein the processing circuitry is further configured to:
receive a set of encoded features generated by the encoders and to determine the minimum distance of each encoded feature to one of the clusters stored in the database.

17. The system of claim 16, wherein the processing circuitry is further configured to:
predict the current and future operating conditions of a PE device under test based on the minimum distance and the latent contextual feature.

18. A non-transitory computer readable medium having instructions stored therein that, when executed by one or more processor, cause the one or more processors to perform a method for performing prognostics of power electronic (PE) devices installed in vehicles comprising:
generating training datasets of median ON data of healthy PE devices operated under varying conditions;
training an autoencoder, the autoencoder including an encoder, a decoder and a feature space, with the training datasets until there is minimum error between the training datasets and a decoded output of the autoencoder;
receiving a first set of encoded features representing the training datasets from the feature space of the autoencoder;
K-means clustering the first set of encoded features to generate clusters representing the varying conditions;
developing a prognostic for each cluster;
storing the prognostic for each cluster;
receiving testing datasets of median ON data of a PE device under test;
inputting the testing datasets to the encoder;
generating a second set of encoded features representing the testing datasets;
determining a distance of the second set from each cluster;
matching the second set to the cluster which is at a minimum distance from the second set; and
predicting at least one of a current operating condition and a future operating condition of the PE device under test based on the minimum distance from the cluster.

19. The non-transitory computer readable medium method of claim 18, further comprising:
training the autoencoder with a plurality of training datasets of median ON data of healthy PE devices, the datasets each operated under varying conditions and each generated by a different latent contextual feature;

K-means clustering each first set of encoded features to generate clusters representing the varying conditions and a different latent contextual feature;

storing the clusters of each encoder in a database with the latent contextual feature for each cluster.

20. The non-transitory computer readable medium method of claim 19, further comprising:

inputting the testing datasets to the autoencoders;

determining the set of distances of a second set of encoded features from each cluster in the database;

matching the second set of encoded features to the cluster in the database which is at a minimum distance from the second set of encoded features; and predicting current and future operating conditions of the PE device under test based on the minimum distance from the cluster and its latent contextual feature.

\* \* \* \* \*